United States Patent Office 3,661,863
Patented May 9, 1972

3,661,863
COPOLY(AMIDE-IMIDE)S COMPRISING THE REACTION PRODUCT OF A DIACID, A TRIACID AND BIS(4-AMINOCYCLOHEXYL)METHANE
Robert W. Campbell, Bartlesville, Okla., assignor to Phillips Petroleum Company
No Drawing. Filed June 11, 1970, Ser. No. 45,586
Int. Cl. C08g 20/32
U.S. Cl. 260—78 TF
9 Claims

ABSTRACT OF THE DISCLOSURE

Copoly(amide-imide)s are obtained by using a combination of both a dicarboxylic acid and tricarboxylic acid in polymerization with PACM.

---

This invention relates to copolymers of the poly(amide-imide) type.

Heretofore, synthetic fibers of the polyamide type have been prepared by polymerizing PACM, i.e., p-aminocyclohexylmethane or bis(4-aminocyclohexyl)methane, with a variety of diacids. The prior art, such as United States Letters Patent 2,512,606, 3,249,591, and 3,393,210 use only a diacid in polymerization reactions with PACM.

A polyamide has the general repeating structure

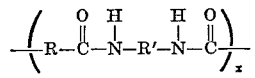

resulting from the reaction of a dicarboxylic acid with a diamine splitting out H$_2$O. R and R' indicate long chain hydrocarbyl radicals. A poly(amide-imide) is formed similarly, but by use of a tricarboxylic acid and a diamine to produce

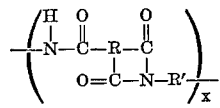

My new products, which I term copoly(amide-imide)s are polymers containing both polyamide and poly(amide-imide) units in the polymer chain. This type of polymer is formed by reaction of a diamine with a mixture of both a dicarboxy and a tricarboxy acid. The ratio of one type of unit to the other, i.e., polyamide:poly(amide-imide), depends on the relative moles of triacid:diacid used in the polymerization reaction.

I have obtained surprising and unexpected results by using both a diacid and a triacid together in a polymerization reaction with PACM. Among the highly desirable benefits obtained are:

lower melting temperature range for improved fabrication,
tough, optically clear and colorless polymers,
fiber grade copoly(amide-imide)s of improved dyeability, increased moisture absorption, hence increased comfort and improved antistatic properties in the fibers.

Among the objects of my invention is that of providing a method of preparing copoly(amide-imide)s which will provide one or more of the aforesaid benefits.

Other aspects, objects, and the several advantages of my invention will be apparent to one skilled in the art from the following description and from my appended claims.

PACM used in my copoly(amide-imide) polymers is designated as to its isomer content by the percent of trans, trans (t,t); cis,cis (c,c); and cis,trans (c,t) isomers present. For example, PACM (55 t,t), indicates a content of 55 mole percent of the trans,trans isomer. The balance of the PACM is a mixture of cis,trans, and cis,cis such as, for example, 38 mole percent c,t plus 7 mole percent c,c. The t,t isomer content is a factor in determining the character and utility of a PACM copoly(amide-imide).

The t,t isomer content of PACM useful in my invention can range broadly from 30 to 80 mole percent. PACM of approximately 50 to 55 mole percent is preferred in synthesizing my copoly(amide-imide)s for tough, colorless, optically clear molding resins. PACM of approximately 55 to 80 mole percent is preferred in my copoly(amide-imide)s for fibers applications. I consider C-methyl derivatives of PACM to be equivalent in usefulness to PACM in my invention, using the C-designation to distinguish from and exclude N-methyl derivatives.

Useful diacids are the straight chain α,ω-diacids of carbon number range from $C_6$ to $C_{16}$, counting the carboxyl carbon atoms, with a range of $C_8$ to $C_{12}$ being preferred for both molding and fiber purposes. Suitable diacids include suberic acid, sebacic acid, 1,12-dodecanedioic acid, and the like.

Triacids useful in my invention are the tricarboxylic acids having from 6 to 15 carbon atoms, counting the carboxyl carbon atoms, including the aryl tricarboxylates. Typical tricarboxylic acids include 1,2,3-propanetricarboxylic acid, 1,2,4-butanetricarboxylic acid, 1,2,4-cyclohexanetricarboxylic acid, benzene 1,2,4-tricarboxylic acid, 6-ethylnaphthalene 1,2,5-tricarboxylic acid, and the like.

Between 5 and 60 mole percent of the tricarboxylic acid can be employed, based on the total carboxylic acid, the balance being a dicarboxylic acid. Preferably from about 15 to 50 mole percent of the tricarboxylic acid is used.

The following examples illustrate the several aspects of my invention and the surprising effectiveness of the use of the combination of acids with PACM in the preparation of copoly(amide-imide)s.

EXAMPLE I

To an unstirred 1 liter autoclave was charged PACM 69.98 g., 0.3328 mole, 55 mole percent t,t; 1,12-dodecanedioic acid 57.48 g., 0.2496 mole, 1,2,3-propane-tricarboxylic acid 14.65 g., 0.0832 mole; and 45 ml. of distilled water. Air was removed from the system by alternately evacuating and flushing with 10 p.s.i.g. nitrogen four times. The autoclave was closed under 10 p.s.i.g. nitrogen and heated to 230° C. over a 1.5 hour period. It was maintained at this temperature for 0.5 hour and then heated to 300° C. in one hour. After heating at 300° C. for one hour at a maximum pressure of 460 p.s.i.g., steam was vented slowly over 0.5 hour at this same temperature and then the pressure was further reduced to 20 mm. Hg under a nitrogen atmosphere during the next 0.5 hour. The product mixture was allowed to cool to room temperature under 10 p.s.i.g. nitrogen.

The copoly(amide-imide) obtained in this Run 1 was completely clear and transparent as opposed to the opaque materials obtained if a comonomer such as adipic acid or 1,6-hexanediamine was used in place of the triacid. The product softened and flowed at 215° C. polymer melt temperature (PMT) and had an inherent viscosity of 1.13 in m-cresol (0.5 percent at 30° C.). This product was extremely tough as obtained, and failed to become brittle even at −70° C. Films were pressed at 240° C. which were tough, rigid and extremely tear-resistant.

Additional evidence of the copoly(amide-imide) product's ability to remain clear (indicating lack of crystallizability) is obtained from its differential thermal analysis (DTA). The latter shows a glass transition at 145° C. and no additional transitions with increasing temperatures. In contrast, PACM (55 mole percent t,t)-1,12-dodecanediamide shows crystallinity (or crystallizability) by this technique as pre-melt crystallization exotherms and $T_m$ or crystalline melting point endotherms. $T_m$ is the temperature at which the crystallites, small crystalline volumes in which quite precise chain orientation exists, melt. Mechanical properties of slabs molded from the copoly(amide-imide) product of Run 1 are:

| | ASTM method |
|---|---|
| Density (grams per cc.): 1.0564 | [1] D 1505 |
| Flexural modulus (p.s.i.): 225,000 | [1] D 790 |
| Tensile yield (p.s.i.): 8,905 | D 638 |
| Elongation (%): 48 | D 638 |
| Hardness (Shore D): 80 | D 2240 |
| Izod impact (ft.-lbs/in notch): 2.46 | D 256 |

[1] Modified.

EXAMPLE II

Reactions were carried out using the same reactions and reaction conditions as described in Example I above, except respectively using 20 mole percent of triacid and 15 mole percent triacid, as opposed to the higher amount used in Example I above. The products of both of these runs, i.e., Runs 2 and 3, using respectively, 20 and 15 mole percent of the triacid, also were very transparent, and also exhibited good mechanical properties similar to those described above in Example I.

Reactions were also carried out using, respectively, suberic (1,8-octanedioic) acid and azelaic (1,9-nonanedioic) acid in place of the dodecanedioic acid. The resulting copolymers, Runs 4 and 5, were shown by DTA to be amorphous.

EXAMPLE III

A glass reactor was charged with PACM 4.1201 g., 19.6 mmoles, 55 mole percent t,t, adipic acid 2.1603 g., 15 mmoles, and 1,2,3-propanetricarboxylic acid 0.8826 g., 5 mmoles. Air was removed from the system by pressuring to 10 p.s.i.g. nitrogen and slowly evacuating. This was repeated three times. The system was placed under 10 p.s.i.g. nitrogen and heated from 130 to 210° C. over a one hour period, from 210 to 275° C. in one hour, from 275 to 320° C. in 0.5 hour, and maintained at 320° C. for one hour. Throughout this interval the system pressure was vented and repressured to 10 p.s.i.g. with nitrogen every five minutes. The reaction mixture was slowly swept with nitrogen as the temperature was maintained at 320° C. for 0.5 hour. The pressure was then slowly reduced to 30 mm. Hg over a 0.25 hour period and maintained under these conditions for 0.45 hour. The product was cooled to room temperature under nitrogen and adhering glass was removed from the polymer plug. The product had a PMT of 285° C., and an inherent viscosity of 0.84, using 0.5 weight percent in m-cresol at 30° C.

This example, Run 6, illustrates the preparation of a PACM-adipic acid/1,2,3-propanetricarboxylic acid (75/25 mole percent) copoly(amide-imide) copolymer. The similar preparation of PACM-adipic acid polyamide, without the inclusion of any tricarboxylic acid in the reaction, resulted in a polymer with a melting point of 350° C. with decomposition, and an inherent viscosity of only 0.50. Thus, the inclusion of the tricarboxylic acid plus the dicarboxylic acid resulted in a copolymer much more effective and useful in fibers and molded object formation, since its lower melting temperature range permits lower temperature melt fabrication.

EXAMPLE IV

A similar reaction, Run 7, involving 19.6 mmoles PACM, 10 mmoles each of both adipic acid and 1,2,3-propanetricarboxylic acid, with a final polymerization at 280° C. gave a product with PMT of 250° C., a $T_m$ of 290° C. by DTA and an inherent viscosity of 0.55 m-cresol (0.5 percent at 30° C.).

Another reaction, Run 8, involving 20 mmoles PACM, 5 mmoles of 1,12-dodecanedioic acid and 15 mmoles of adipic (1,6-hexanedioic) acid with a final polymerization at 320° C. gave a heterogeneous polymer with a PMT of 320° C., a $T_m$ of 343° C. and an inherent viscosity of 0.85 m-cresol (0.5 percent at 30° C.). This, compared with the results of Run 7 and Run 6, illustrates the benefits in using 1,2,3-propanetricarboxylic acid as a comonomer.

The polyamide obtained from PACM (55 mole percent trans,trans) and adipic acid has an extremely high melting point, and consequently is difficultly, if at all, melt fabricated. Its $T_m$ is about 350° C. with decomposition, and the inherent viscosity of such a polymer about 0.50. Compare, however, the surprising results obtained by the inclusion of a tricarboxylic acid in preparation of a copoly-(amide-imide) under identical conditions as shown in the following table:

TABLE I

| Run Number | Comonomer | Mole percent | $T_m$, ° C. | Inherent viscosity |
|---|---|---|---|---|
| 9 | None | 0 | [1] 350 | 0.50 |
| 10 | Propane 1,2,3 | 25 | 322 | 0.91 |
| 11 | do | 40 | 309 | 0.84 |
| 12 | 1,12-diacid | 25 | 343 | 0.85 |

[1] Decomposition.

Surprisingly, the inclusion of a triacid, even at equivalent mole percentage, results in a greater melting point reduction in the product than does the inclusion of a long chain diacid. Prior experience has been that long chain acids are more effective than short chain acids in lowering the melting values; and that the introduction of rings in the polymer structure, such as are introduced through the use of the triacid, tended to raise melting points. Therefore, the effectiveness of the short chain-length carboxylic acid and introduction of the ring formation, resulting in a definitely reduced melting point, are surprising and unexpected results in themselves.

EXAMPLE V

Additional runs were made varying the t,t content of the PACM and reacting this with either 25 mole percent of a tricarboxylic acid or 0 mole percent of a tricarboxylic acid, to show the variation in the melting temperature and glass transition temperatures of the resulting polymers. Comparative runs are shown with the inclusion of two runs of a preparation of a polyamide by reaction of a six carbon diamine with a six carbon diacid, also including in one run of 25 mole percent of a tricarboxylic acid in place of the diacid. Again, effective temperature reduction was obtained.

TABLE II

| Run No. | Polymer | Mole percent 1,2,3-P [1] | $T_g$ (° C.) [2] | $T_m$ (° C.) |
|---|---|---|---|---|
| 13 | PACM (55% trans, trans)-12 | 0 | 132 | 264 |
| 14 | do | 25 | 145 | 215 |
| 15 | PACM (78% trans, trans)-12 | 0 | 137 | 288 |
| 16 | PACM (71% trans, trans)-12 | 25 | 145 | 250 |
| 17 | 6-6 | 0 | 50 | 265 |
| 18 | 6-6 | 25 | 45 | 231 |

[1] 1,2,3-propanetricarboxylic acid.
[2] $T_g$ is the glass transition point. This is the point at which a polymer loses hardness and becomes decidedly more flexible. This is considered to be a breakdown of the intermolecular forces between polymer chains, i.e., the point where it becomes possible for chain movement to occur relative to each other, except within crystallites, small crystalline volumes in which quite precise chain orientation remains.

The combination of properties results in easier processibility at lower temperatures without sacrificing high temperature performance as reflected by the $T_g$.

EXAMPLE VI

Synthetic fibers from PACM–12 polyamides, derived from a PACM of more than 70 mole percent t,t content, have heretofore been claimed to exhibit desirable properties. However, major problems have existed since these fibers have low water absorption. Low water absorption means poor dyeability, and generally poor comfort to the wearer of fabrics prepared from such fibers, i.e., the wicking ability of the fibers is poor and hence there is poor removal of perspiration from the body surface.

Similar polymers prepared from high t,t content PACM and including the combination of a tricarboxylic acid with a dicarboxylic acid result in copolymers with useful mechanical properties, reduced melting temperature ranges making the polymers more easily spun into fibers, and at the same time improving dyeability and moisture absorption and hence comfort.

TABLE III.—INCREASED WATER ABSORPTION

| Run No. | Mole percent 1,2,3-P [1] | Percent t,t (PACM) [2] | Percent water absorption [3] |
|---|---|---|---|
| 19 | 0 | 55 | 2.86 |
| 20 | 25 | 55 | [4] 3.61 |
| 21 | 0 | 73 | 2.71 |
| 22 | 25 | 73 | [5] 3.54 |

[1] 1,2,3-propanetricarboxylic acid, balance being 1,12-dodecanedioic acid
[2] Mole percentage trans,trans configuration in the PACM.
[3] Measured on 5 mil film at 65% relative humidity.
[4] A 26% increase.
[5] A 31% increase.

Ability to absorb water is known to contribute to increased comfort and improve antistatic properties in synthetic fibers. Comparing runs 20 and 22 with the control runs 19 and 21 above, showing over 25 percent increases in water absorption properties on fibers based on a 55 mole percent t,t PACM and over 30 percent water absorption increased on fibers based on 73 mole percent t,t PACM.

EXAMPLE VII

A sample of a copoly(amide-imide) of PACM (74 mole percent t,t)-1,12-dodecanedioic acid/1,2,3-propanetricarboxylic acid wherein the tricarboxylic acid represented 25 mole percent of the acid present in the reaction mixture and dodedecanedioic acid represented 75 percent of the acid was melt spun into fiber at 290° C. and drawn 3.5 times at a plate temperature of 200° C. The product gave a good filament with the mechanical properties: Tenacity 3.0 g.p.d., elongation 28 percent, and initial modulus 37 g.p.d. The sample further was tested by dyeability and found to have appreciably and desirably increased dyeability in a dispersed dye system over the corresponding polyamide synthesized from PACM and 1,12-dodecanedioic acid.

Typical reaction conditions for preparation of my copoly(amide-imide)s, by reaction of the combination of a tricarboxylic acid and a dicarboxylic acid with PACM or with C-methyl derivatives of PACM, include heating o fthe reaction mixture, in a nitrogen atmosphere, using either stirred or unstirred reactors, under from 10 to 600 p.s.i.g., up to temperatures ranging from 210 to 330° C. over between one and three hours. The mixture usually is maintained at the maximum temperature reached over a further interval of between 0.5 and about two hours. Gaseous products including primarily steam then are vented, and the mixture maintained under a nitrogen atmosphere at a pressure of from about one atmosphere to very low vacuum over an additional interval of from about 0.5 to three hours. In order to avoid crosslinking, about a 2 mole percent diamine deficiency frequently is preferred, i.e., the equivalent amount of carboxylic acid present in the reaction mixture should be slightly in excess relative to the amount of diamine present.

In my description, including the examples, I have shown the beneficial results obtainable by using a diacid plus a triacid with a PACM in making copoly(amide-imide)s. Certainly, variations and modifications are possible, without straying from the scope and spirit of my disclosure including my claims appended.

I claim:

1. A copoly(amide-imide) prepared by polymerizing in combination carboxylic acids consisting essentially of at least one diacid, and at least one triacid, and at least one of bis(4-aminocyclohexyl)methane and C-methyl derivatives thereof,
wherein said diacid contains from 6 to 16 carbon atoms per molecule, said triacid contains from 6 to 15 carbon atoms per molecule, and said bis(4-aminocyclohexyl)methane or C-methyl derivatives thereof have a t,t content of from 30 to 80 mole percent, and wherein said copoly(amide-imide) contains from 95 to 40 mole percent of said diacid, and correspondingly from 5 to 60 mole percent of said triacid, based on the total moles employed of both diacid and triacid.

2. A tough, optically clear copoly(amide-imide) according to claim 1 wherein said t,t content is from 50 to 55 mole percent.

3. A fiber-grade, moisture absorbent copoly(amide-imide) according to claim 1 wherein said t,t content is from 55 to 80 mole percent.

4. A copoly(amide-imide) according to claim 1 wherein said diacid has from 8 to 12 carbon atoms, and said amount of triacid is from 15 to 50 mole percent based on the total moles of both diacid and triacid.

5. A copoly(amide-imide) according to claim 4 wherein said diacid is 1,12-dodecanedioic acid, and said triacid is 1,2,3-propanetricarboxylic acid.

6. A copoly(amide-imide) according to claim 4 wherein said diacid is adipic acid and said triacid is 1,2,3-propanetricarboxylic acid.

7. A copoly(amide-imide) according to claim 4 wherein said diacid is azelaic acid, and said triacid is 1,2,3-propanetricarboxylic acid.

8. A copoly(amide-imide) according to claim 4 wherein said diacid is suberic acid and said triacid is 1,2,3-propanetricarboxylic acid.

9. A copoly(amide-imide) according to claim 4 wherein the mole ratio of carboxylic acid group to said bis(4-aminocyclohexyl)methane and C-methyl derivatives thereof is from about equivalent to about 2 mole percent diamine deficiency.

References Cited

UNITED STATES PATENTS

| 2,512,606 | 6/1950 | Bolton et al. | 260—78 |
| 3,249,591 | 5/1966 | Gadecki et al. | 260—78 |
| 3,393,210 | 7/1968 | Speck | 260—78 X |

FOREIGN PATENTS

| 1,544,632 | 10/1968 | France. |

HOWARD E. SCHAIN, Primary Examiner

U.S. Cl. X.R.

57—140 R